United States Patent
Krippelz, Sr. et al.

(10) Patent No.: US 6,662,421 B1
(45) Date of Patent: Dec. 16, 2003

(54) METHOD AND APPARATUS FOR INSTALLATION OF RUBBER TRACKS ON VEHICLES

(76) Inventors: Joe Krippelz, Sr., 930 Stamford Pl., Sugar Grove, IL (US) 60594; Jacob Krippelz, Jr., 33 Winwood Ct., Aurora, IL (US) 60506

( * ) Notice: Subject to any disclaimer, the term of this patent is extended or adjusted under 35 U.S.C. 154(b) by 30 days.

(21) Appl. No.: 09/888,728

(22) Filed: Jun. 25, 2001

(51) Int. Cl.$^7$ .............................................. B23P 11/02
(52) U.S. Cl. ......................... 29/450; 29/446; 29/464; 29/559; 248/231.41; 248/229.12
(58) Field of Search ...................... 29/450, 252, 239, 29/238, 446, 464, 559; 474/130; 254/93 R, 100; 72/705; 248/316.4, 689, 690, 231.41, 228.3, 229.21, 229.12

(56) References Cited

U.S. PATENT DOCUMENTS

| | | | |
|---|---|---|---|
| 3,463,428 A | * 8/1969 | Kindorf et al. ............... 248/72 |
| 4,118,003 A | * 10/1978 | Dillow ....................... 248/539 |
| 4,227,748 A | 10/1980 | Meisel, Jr. .................. 305/10 |
| 4,279,318 A | 7/1981 | Meisel, Jr. ................. 180/9.64 |
| 4,283,828 A | 8/1981 | Cole, Sr. ..................... 29/256 |
| 4,650,260 A | 3/1987 | Satzler ....................... 305/31 |
| 4,683,632 A | 8/1987 | Kalman ..................... 29/281.1 |
| 4,794,675 A | * 1/1989 | Bisconti ..................... 24/455 |
| 4,861,120 A | 8/1989 | Edwards et al. ........... 305/35 R |
| 5,024,408 A | * 6/1991 | Magee ...................... 248/206.5 |
| 5,045,030 A | 9/1991 | Cunningham ............... 474/138 |
| 5,129,134 A | 7/1992 | St. Angelo, Jr. et al. ... 29/281.1 |
| 5,676,436 A | 10/1997 | Hart ........................... 305/157 |
| 5,816,462 A | * 10/1998 | Brantley ..................... 224/570 |
| 5,851,058 A | 12/1998 | Humbek et al. ........... 305/146 |
| 5,857,477 A | * 1/1999 | James ...................... 135/88.06 |
| 5,918,358 A | 7/1999 | Ffield et al. ................. 29/559 |
| 5,984,438 A | 11/1999 | Tsunoda et al. ............ 305/169 |
| 5,988,775 A | 11/1999 | Nordberg ................... 305/143 |
| 5,996,736 A | * 12/1999 | Stankiewicz ................ 182/127 |
| 6,065,818 A | 5/2000 | Fischer ....................... 305/179 |
| 6,378,826 B1 | * 4/2002 | Knaub et al. ........... 248/229.21 |
| 6,401,318 B1 | * 6/2002 | Bruyn ........................ 29/271 |
| 6,494,642 B1 | * 12/2002 | Daly ........................... 405/36 |

* cited by examiner

Primary Examiner—Gregory Vidovich
Assistant Examiner—Stephen Kenny
(74) Attorney, Agent, or Firm—Ryndak & Suri

(57) ABSTRACT

An apparatus for installing a continuous track onto a track-driven vehicle is provided. In one embodiment, the apparatus comprises a first curved track engaging member, a second curved track engaging member and an elongated member connecting the first and second curved track engaging members in opposed relation. A method of installing a flexible drive track around the drive mechanism on a track-driven vehicle is also provided.

16 Claims, 12 Drawing Sheets

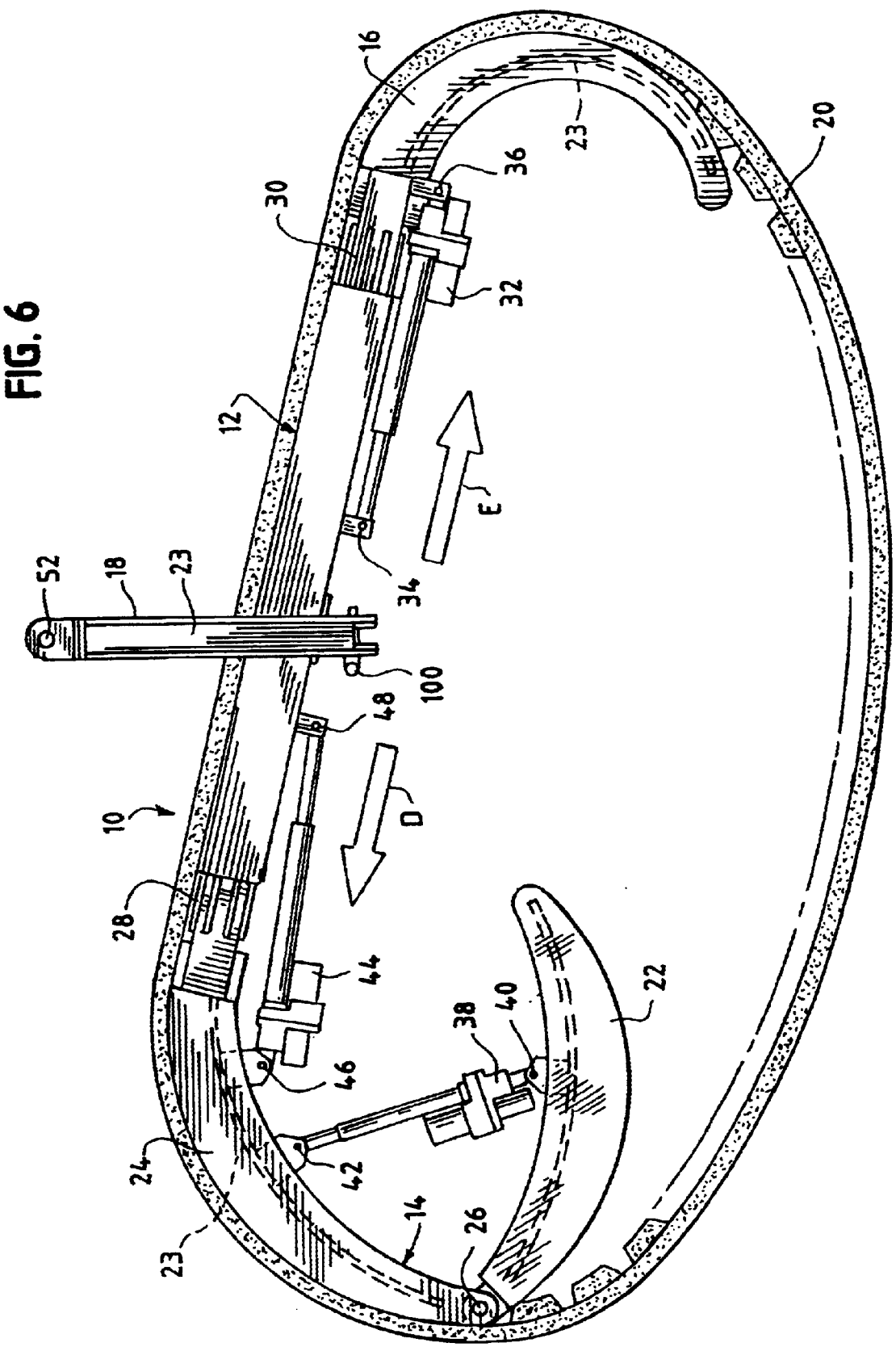

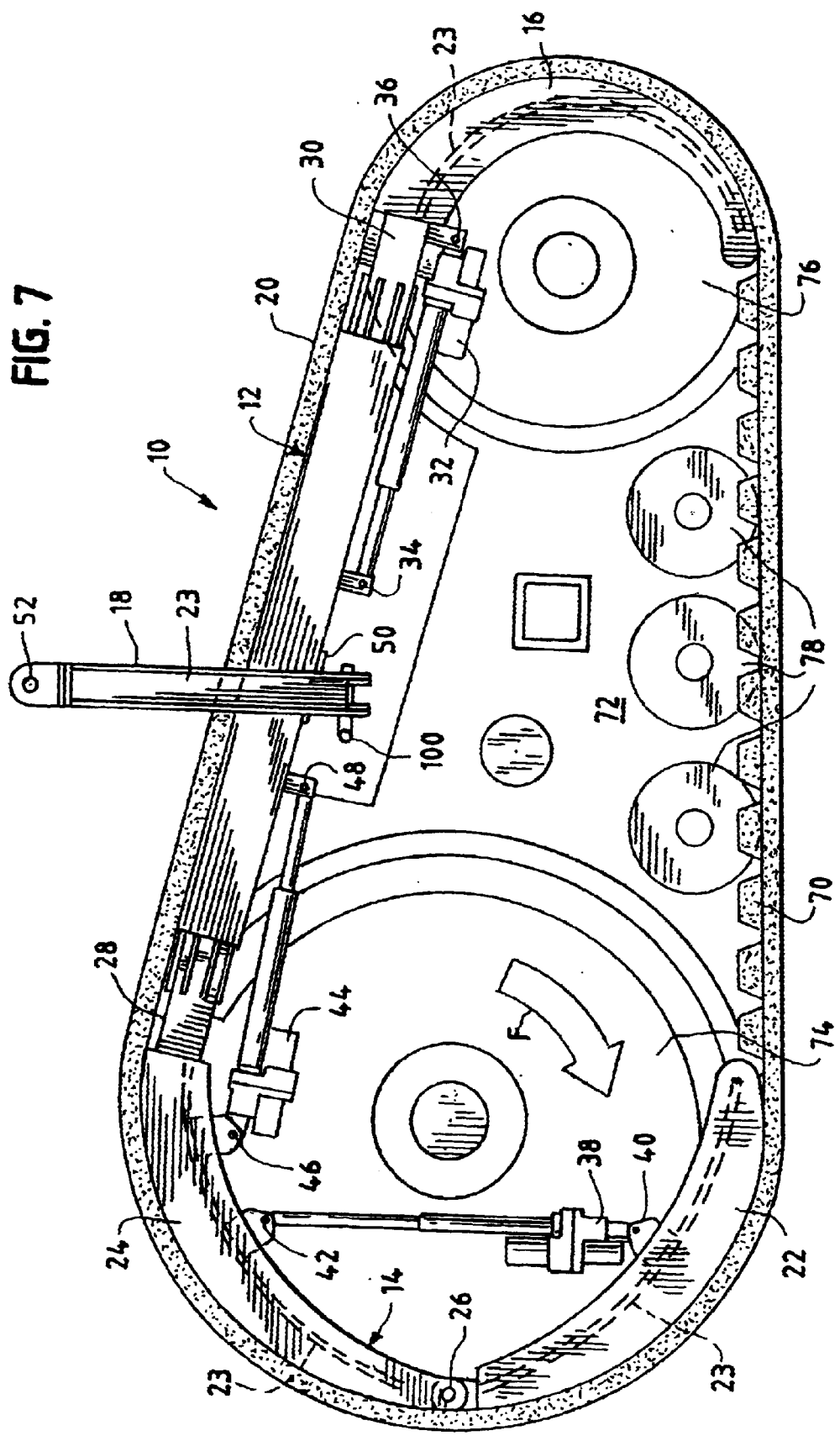

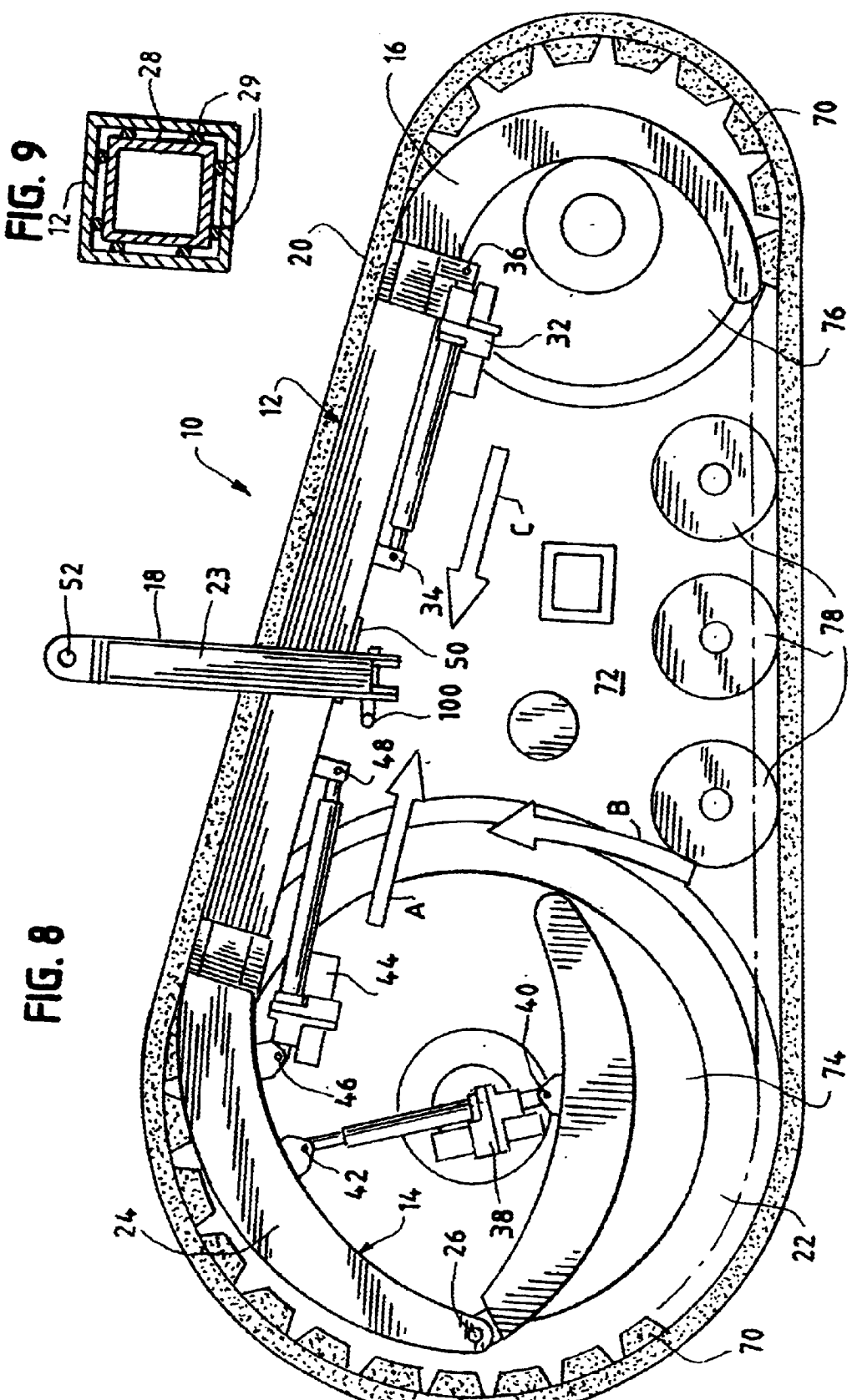

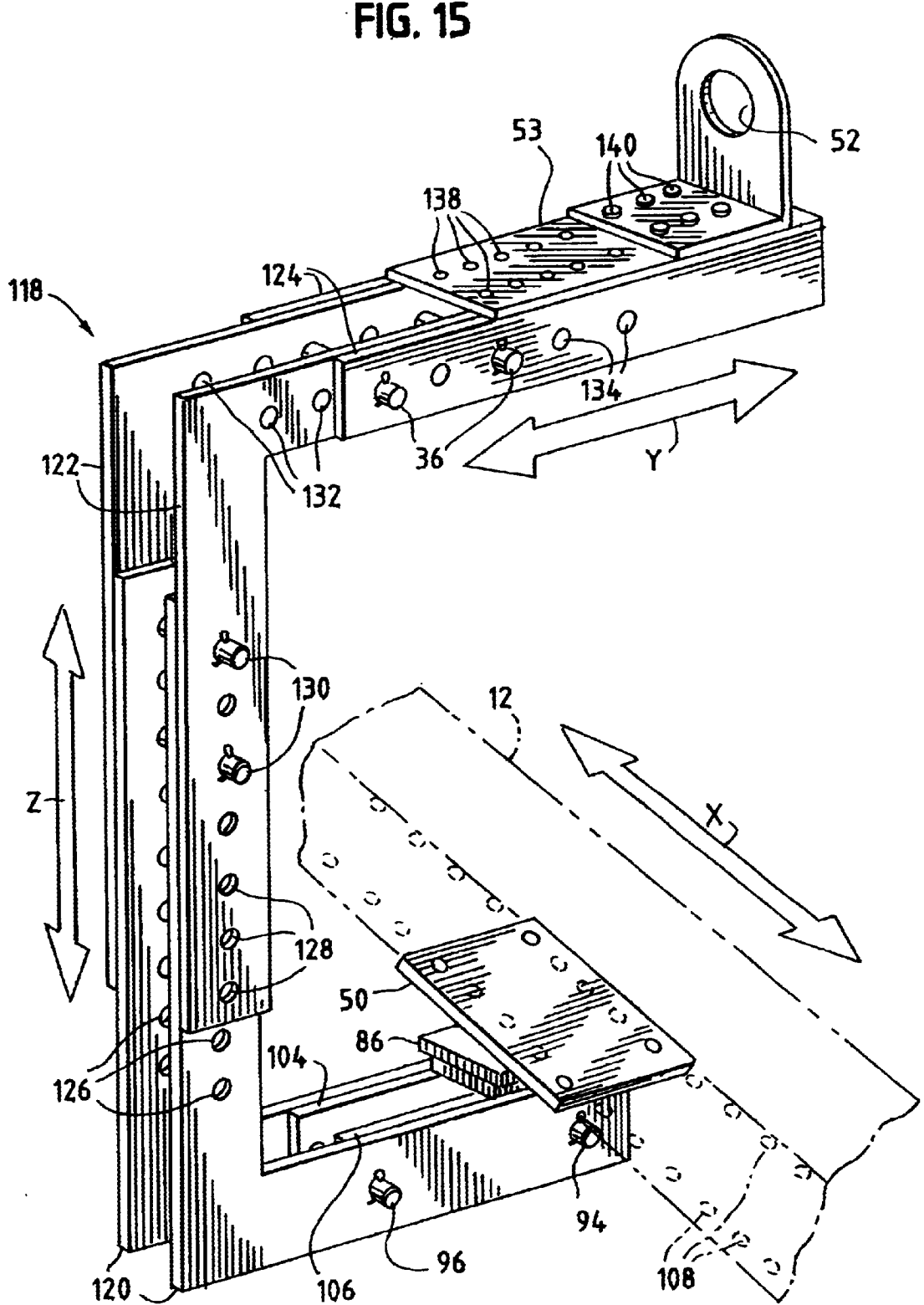

METHOD AND APPARATUS FOR INSTALLATION OF RUBBER TRACKS ON VEHICLES

FIELD OF THE INVENTION

The present invention relates generally to a method and apparatus for the installation and removal of rubber track belts on a vehicle or machine, for manufacture of the vehicle or service of either the vehicle or the track.

BACKGROUND OF THE INVENTION

Continuous rubber tracks are used to propel vehicles or machines. In particular, the use of such tracks has found success in the agricultural field. These tracks have several advantages over other forms of propulsion and are desirable as a mode of travel. One of the known advantages is in distributing the weight of the load a vehicle may carry. This facilitates travel when the ground is wet and reduces undesirable soil compaction. Another advantage is the greater traction allowed by having a greater surface contact area with the traveling surface, which is useful for pulling farm implements.

Such tracks are typically trained around a set of wheels. Motive force is transmitted to the track in a desired manner. Typically, at least one of the wheels in contact with the track is driven, causing the vehicle to travel. In one embodiment, these wheels are separable about their circumference allowing the wheel to be split into halves. This assists in facilitating the installation and removal of the tracks, particularly with a track having a central, inwardly extending circumferential rib. The wheels separate along a circumferential groove typically located at the center of the width of each wheel. This groove allows the track to stay aligned on the otherwise flat surface of the wheel. When the outer half of each wheel is removed from a particular side of the vehicle, the track is ready for installation or removal.

However, the flexible rubber tracks for large farm tractors are very large and very heavy (sometimes in excess of several thousand pounds). Consequently, such tracks are cumbersome and can be dangerous to work with. For example, the width of the tread may be up to three feet across. Such tracks are particularly difficult to handle. Unlike rigid components that can easily be lifted and placed with standard work equipment such as hoists, flexible tracks may assume many different undesirable shapes as different forces are applied. For example, the tracks are typically banded together and once a track is unbanded it may fall over if not handled properly. To lift the track and maintain and/or achieve the desired shape of the track is difficult and requires considerable manpower and time.

Prior to the present invention, the track was removed and installed with cumbersome chains and hoists. One method was to use another lifting vehicle in combination with chains and at least several workers to shape the track and force it into place onto the desired vehicle or machine. This procedure has many drawbacks. One drawback is the risk of damaging the track. In addition, that procedure is labor intensive and relatively dangerous. Another method of installation or removal uses a specific fixed, rigid frame to drape the track around it and then place it onto the vehicle. These frames, being of a fixed and rigid shape are of limited capability and generally cannot be used for another size track or for a different vehicle. In addition, the track must be shaped, manually or by machine, to allow the track to fit around the static frame. This rigid frame is further limited by a lack of maneuverability and versatility for installation or removal. Chains are attached to the sides of this frame when needed to pick the frame up and maneuver it into position to place or remove a track. This device was also complicated with many independently adjustable fasteners, bolts, hooks, slots and brackets.

A need exists for a versatile, safe and efficient way to install and remove rubber tracks on vehicles, particularly on large vehicles such as large track driven farm tractors.

SUMMARY OF THE INVENTION

In accordance with one aspect of the invention, an apparatus for installing a continuous track onto a track driven vehicle or a portion of the vehicle is provided. The apparatus includes a first curved track engaging member and a second curved track engaging member having an adjustable curvature. An elongated member connects the first and second curved track engaging members in opposed relation with the elongated member being of an adjustable length to permit the distance between the first and second curved track engaging members to be adjusted.

In accordance with one aspect of the invention, the first curved track engaging member has a curvature that approximates the installed curvature of that portion of the track engaged by the first curved track engaging member and the adjustable second curved track engaging member, when adjusted to a desired curvature, can approximate the installed curvature of that portion of the track engaged by the second curved track engaging member. These may correspond to rear and front or front and rear portions of the installed track, respectively. The second curved track engaging member may be composed of a pivot arm curved to approximate the installed curvature of that portion of the track engaged by the pivot arm when extended to a desired degree.

In accordance with one embodiment of the invention, the pivot arm has a pivotal connection to the second curved track engaging member that selectively extends and retracts by extension of a retractable cylinder that is capable of driving the pivot arm to cause the pivot arm to pivot and move inwardly or outwardly, respectively, in response to retraction or extension of the cylinder.

The elongated member may have at least one selectively retractable and extendable cylinder connected to one curved track engaging member at opposed ends to permit extension or retraction of the curved track engaging member so that when it is adjusted to a desired curvature it can approximate the installed curvature of that portion of the track engaged by the respective extended or retracted curved track engaging member.

In accordance with another aspect of the present invention, an apparatus for installing a continuous track onto a track driven vehicle or portion thereof is provided.

In accordance with another aspect of the invention, the apparatus for installing a continuous track includes a lift point structure that preferably is longitudinally adjustable so that when it is longitudinally adjusted to a desired position the location of an allowable lengthwise balance at or near the center of gravity in the lengthwise vertical plane of the elongated member is approximated when the apparatus is engaged or carries the track thereon. In addition, the lift point structure may be transversely or perpendicularly adjustable relative to the length of the elongated member to permit adjustment to a desired position that approximates the location of a desired balance at or near the center of gravity in the perpendicular direction relative to the length of the elongated member. This permits a combination of tracks of various sizes. The support structure can be of a C-shaped, gooseneck configuration or any other desired configuration or shape.

In accordance with one aspect of the invention, a flexible track is placed onto or removed from a vehicle using an apparatus as previously described, which may have adjustable arms allowing the configuration of the apparatus to approximate the shape of the installed shape of the track to facilitate the installation or removal of the track. Extendible and retractable cylinders may be used for articulation of the arms on the apparatus either extending away from the body of the apparatus or retracting towards the body of the apparatus. Advantageously, a single operator utilizing a hand-held control device may centrally control these retractable cylinders. In one embodiment, two linearly extending opposing arms connected by an elongated member are provided. One of these opposing arms has an additional pivot arm that rotates about a point located on the same opposing arm. This dual motion arm, which is attached to the elongated member on one end and the pivot arm on the other, is contemplated in this embodiment to assist in the installation or removal of the track onto or from a larger wheel on the vehicle. The opposing arm to the dual motion arm can be used to assist in the installation or removal of the track onto or from a smaller wheel on the vehicle. These arms can either be extended or retracted for a desired task. Also, various shapes and sizes of tracks, in width or length, can be accommodated by the adjustment of the apparatus. Further, the center of gravity of the device and track draped thereon can be adjusted by the adjustment of these cylinders to assist in the installation or removal of the engaged track onto or from the vehicle. The center of gravity also can be adjusted by the adjustment of lift point structure allowing for a different installation shape, a different length of track or a different width of track to remain engaged with the apparatus to facilitate installation or removal onto or away from the vehicle. The tracks are readily installed or removed using the apparatus with a minimum of manpower and effort and without damage to the vehicle.

In accordance with the method and apparatus aspects of the invention, a flexible track is placed onto or removed from a vehicle using an apparatus with only two opposing arms extending linearly or pivotally or any combination of the two. The pivot arm may or may not be present in this embodiment. Thus, in one aspect, the two curved end members are permanently curved to a desired curvature that approximates the installed end curvatures of the track. For example, a vehicle with a larger rear wheel and a smaller front wheel would utilize an apparatus with opposing front and back curvatures that approximated the curvature of the rear wheel and the front wheel, respectively. The track would be engaged by the linear extension of the curved arm portions of the apparatus for either removal or installation. The controls can be similar to those described in the first embodiment.

In accordance with another aspect of the present invention, the lift point structure can be of a desired shape and/or configuration to overcome different physical interferences with the installation or removal of the track. For example, a vehicle may have an oversized fender to cover the track that may not allow the current design of the lift point structure to maneuver to a point where the apparatus could engage the track. Further, once the track is installed onto the vehicle and modifications are made to the tractor's appearance or structure, either in the field or in subsequent manufacturing steps, a lifting device used for installation may not be useful for removal. This embodiment contemplates a lift point structure that is able to overcome these problems.

In accordance with yet another aspect of the invention the apparatus may take on a shape that is designed to accommodate certain vehicles with varying physical obstacles to the installation or removal of the track. For example, a mechanism that is necessary to the operation of the vehicle may protrude from the vehicle interfering with and limiting the space with which to engage the track. This embodiment would make changes to the shape of the apparatus to allow the ease of removal or installation in such circumstances.

BRIEF DESCRIPTION OF THE DRAWINGS

FIG. 6 is a side elevational view of the apparatus of FIG. 5 illustrating the linear extension of the apparatus while the apparatus is engaging the track;

FIG. 7 is a side elevational view of the linearly and pivotally extended apparatus of FIG. 6 illustrating the approximate installation placement of the apparatus as engaged with the conformed track which is placed around the vehicle drive mechanism;

FIG. 8 is a side elevational view of the apparatus of FIG. 7 illustrating the disengagement of the apparatus by the linear and pivotal retraction of the apparatus from the placed track;

FIG. 9 is a cross sectional view of the elongated member taken along line 9—9 of FIG. 4;

FIG. 15 is a side elevational view of an alternative embodiment of the lift point structure useful as part of the track installation apparatus of FIG. 1.

DETAILED DESCRIPTION OF THE INVENTION

Figure 1:
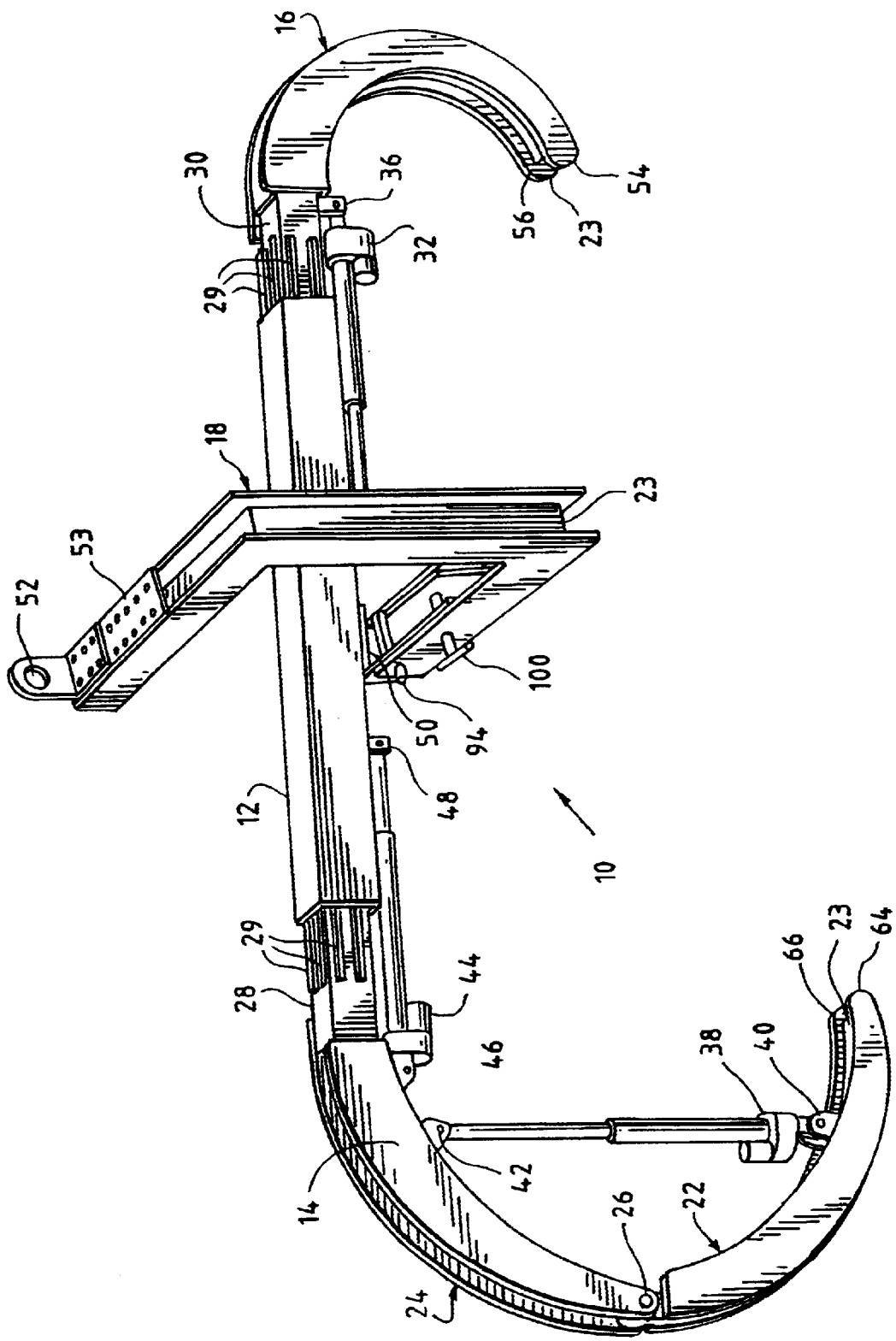
FIG. 1 is a perspective view of the track installation apparatus in accordance with the present invention.
Figure 2:
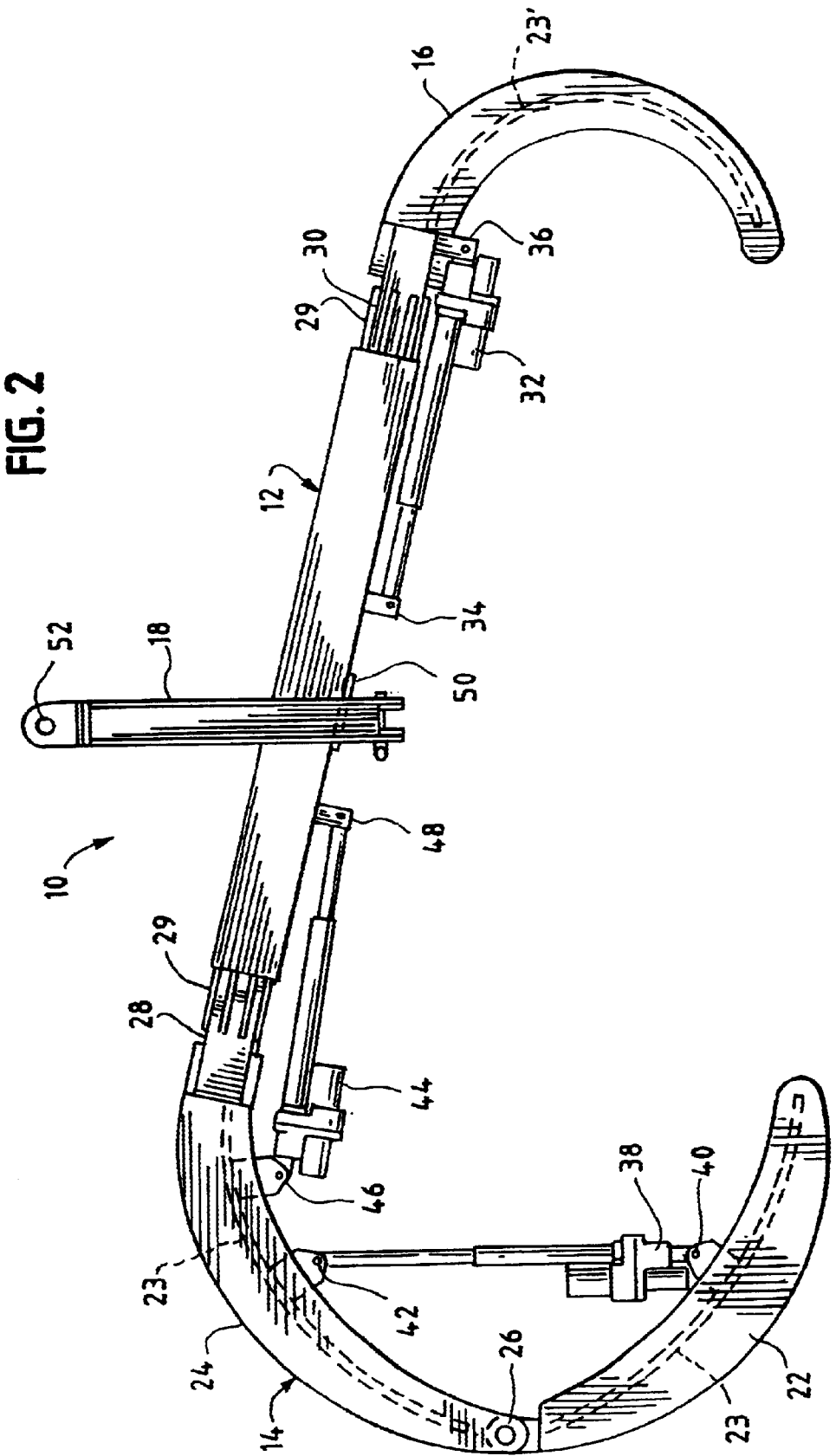
FIG. 2 is a side elevational view of the apparatus of FIG. 1 in a partially extended position.

Referring to the figures generally, and specifically to FIGS. 1, 2, 3, and 4 there is illustrated a flexible track installation and removal apparatus 10 in accordance with the present invention. Apparatus 10 is shown having an elongated member 12, a first curved or arcuate member 14, a second curved or arcuate member 16, and a lift point structure 18. Apparatus 10 as shown can be a relatively large structure (such as on the order of 5 or 10 feet long, or larger, for example) for use in the removal and installation of a rubber track 20 that can weigh thousands of pounds.

As illustrated, elongated member 12 is hollow, although it could be a solid member, if desired.

First member 14 is comprised of a pivotal arcuate segment 22 and a linearly adjustable arcuate segment 24. Both pivot segment 22 and linearly adjustable arcuate segment 24 are strengthened by a suitable reinforcing member 23, as desired. Pivot segment 22 is pivotally connected to linear segment 24 by a pin 26 or other suitable structure. Linear segment 24 moves linearly in extension and retraction by way of a first linear extension member 28 slidably received within one end of elongated member 12. Elongated member 12 thus functions as a sleeve to first extension member 28 through the engagement of a set of contact ribs 29 with the inner surface of elongated member 12. Contact ribs 29 are fixed to the outer surface of first extension member 28 to facilitate the connection with elongated member 12. First member 14 has relatively flat and generally smooth contact points on the outer surface of first member 14 that engage track 20 for removal or installation. As illustrated, first member 14 is provided for the installation and removal of the larger arc of the multiple installation configurations. First member 14 is thus capable of contouring the larger curved portion of track 20 to the desired installation shape through the adjustment of pivot segment 22 and linear segment 24.

Second member 16 has relatively flat and generally smooth contact points on the outer surface of second member 16 that engage track 20 for removal or installation. Second member 16 is also strengthened by reinforcing member 23'. Second member 16 is linearly adjustable (extendible and retractable) by way of a second linear extension member 30 slidably received within the other end of elongated member 12. Second member 16 moves linearly by way of second extension member 30. Elongated member 12 thus functions as a sleeve to second extension member 30 through the engagement of contact ribs 29 with the inner surface of elongated member 12. Contact ribs 29 are fixed to the outer surface of second extension member 30 to facilitate the connection with elongated member 12. As illustrated, second member 16 is provided for the installation and removal of the smaller arc of the multiple installation configurations. Second member 16 is thus capable of contouring the smaller portion of track 20 to the desired installation shape through the adjustment of second member 16. First member 14 and second member 16 are sufficiently wide to support track 20 in their extended positions. First and second members 14 and 16 could be of any curvature as desired, and can be of the same curvature and size, if desired.

Referring to second member 16, the contouring of the smaller arc of the multiple installation configurations is accomplished through the extension and retraction of second member 16 by a first extendable and retractable cylinder 32. First cylinder 32 is attached on one end to elongated member 12 by a pin 34 and is likewise attached to second member 16 by a pin 36, and any other suitable attaching structure may also be used. Second member 16 is able to engage and shape or disengage track 20 in such a way that it successfully completes the desired operation through the linear extension and retraction of first cylinder 32 to a specified distance from elongated member 12.

Now referring to first member 14, the forming or shaping of the larger arc of the multiple installation configurations can be accomplished by several different operations. These operations include the pivotal extension of pivot segment 22 and the linear extension of linear segment 24.

The degree to which first member 14 is hinged open (extended) or closed (retracted) is adjustable through the hinged articulation of pivot segment 22. Pivot segment 22 rotates about pin 26 by the telescoping of a second retractable cylinder 38. Second cylinder 38 is attached to pivot segment 22 by pin 40 and is likewise attached to linear segment 24 by pin 42. Pivot segment 22 is able to engage or disengage track 20 in a way that provides the desired shaping and curvature of the track through the linear extension and retraction of second cylinder 38 to a specified distance from first member 14 causing a pivotal hinged extension of pivot segment 22. The hinged operation of pivot segment 22 allows track 20 to be configured in such a way that the shape of track 20 is conformed to fit a desired configuration, within the constraints of curved segments 22 and 24.

Another operation to configure the larger arc of track 20 is linearly extending first member 14 by linear extension of linear segment 24. Linear segment 24 extends and retracts linearly by the extension and retraction, respectively, of a third retractable/extendible cylinder 44. Third cylinder 44 is attached to linear segment 24 by pin 46 and is likewise attached to the elongated member 12 by pin 48 or any other suitable structure. First member 14 is able to engage or disengage track 20 in a way that provides the desired shaping and curvature of the track through the linear extension and retraction of third cylinder 44 to a specified distance from elongated member 12.

Lift point structure 18 is attached to elongated member 12 in any suitable manner, such as by a mounting plate member 50. Structure 18 can be suspended from a hook, for example, through an opening or hole 52. Hole 52 is formed in mounting structure 53, which can be a piece of angle iron. Mounting structure 53 includes an upstanding portion through which hole 52 is located. As best can be seen from FIG. 1, lift point structure 18 is illustrated as having a "C" shape, to allow for track clearance and the successful placement and removal of the apparatus 10. The "C" shape of lift structure 18 enables apparatus 10 to be inserted and removed from the engaged placement on the inner portion of track 20. Apparatus 10 can be placed into the desired position for engagement by clearing the width of track 20 as the vertical neck of lift structure 18 is displaced away from the engagement location a sufficient distance so as not to interfere or touch track 20 or the vehicle on which track 20 will be installed.

The center of gravity of the track is maintained in several ways, utilizing the features of apparatus 10. The "C" shape of lift structure 18 allows apparatus 10 when engaged with track 20 to essentially hang without causing a rotational force that would cause track 20 to tilt. It is possible that if track 20 tilted to an undesirable degree, track 20 could fall off apparatus 10 or that installation would otherwise be prevented. The "C" shape of lift structure 18 helps to maintain the center of gravity from side-to-side by hanging the apparatus from a point above the apparatus, located at or near the center of gravity. To prevent unnecessary moment forces on lift structure 18, mounting structure 53 allows opening 52 to be positioned in several locations, thus assisting in maintaining the center of gravity from side-to-side. To further accommodate the center of gravity of apparatus 10, mounting plate 50 is adjustable longitudinally to assist in maintaining the center of gravity so as to prevent the unwanted front-to-back tipping of apparatus 10. Fine tuning the center of gravity to prevent the tipping of apparatus 10 from front-to-back can be accomplished through the extension and/or retraction of first cylinder 32, second cylinder 38, or third cylinder 44.

Any suitable structure can be used as desired for first member 14 and second member 16.

Figure 3:
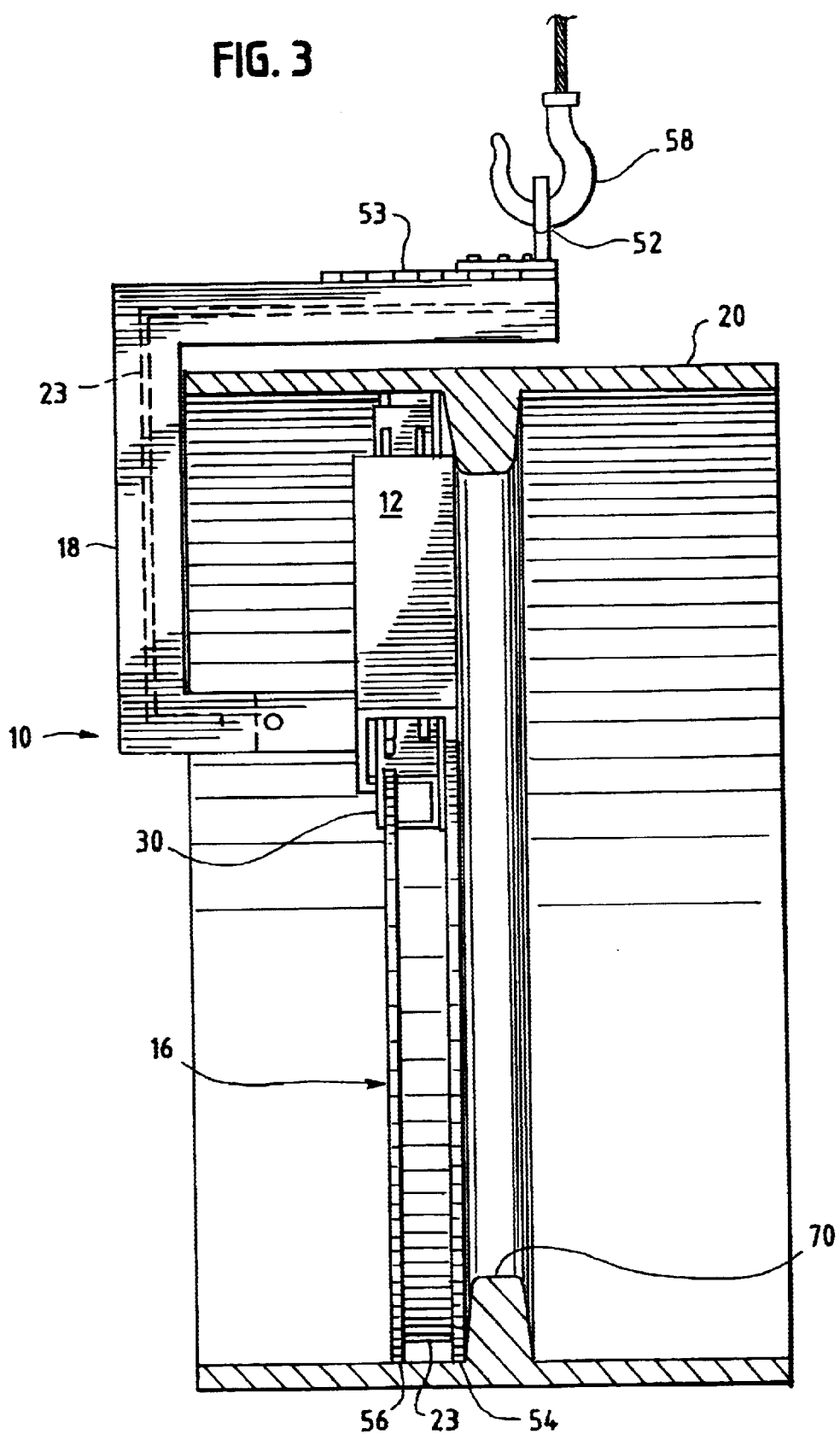
FIG. 3 is a front elevational view of the apparatus of FIG. 1 while engaged with a track shown in section, illustrating the engaging placement of the apparatus in relation to the track.
Figure 4:
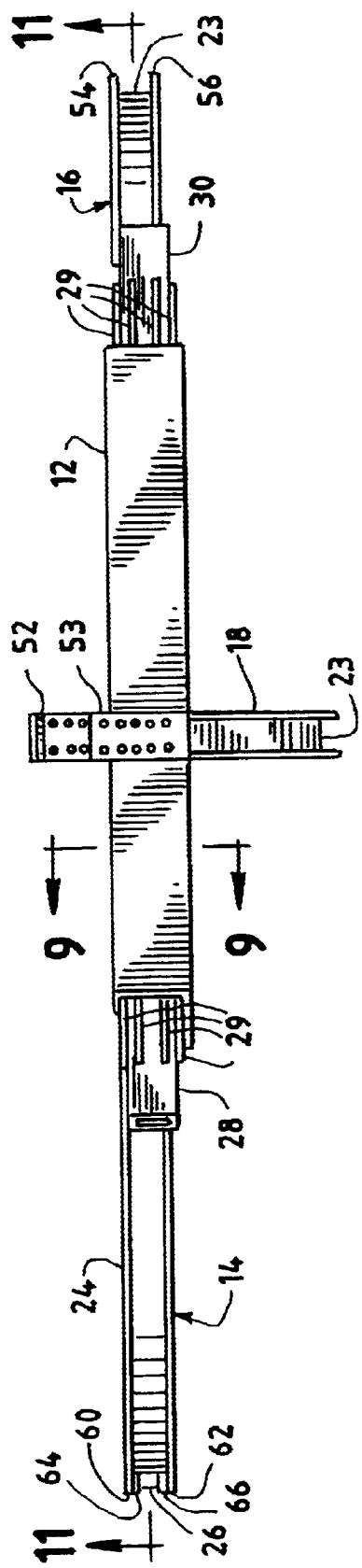
FIG. 4 is a top elevational view of the apparatus of FIG. 1.

As can be seen in FIG. 3 and FIG. 4, second member 16 is comprised of a first curved plate 54 and a second curved plate 56 held together to form a rigid body by reinforcing member 23. First plate 54 and second plate 56 work together as a single structure to engage track 20 as described above referring to second member 16. Referring to FIG. 3, when engaging'the track, first plate 54 is moved into a position where first plate 54 rests along the inner side of the alignment cogs 70. First plate 54 and second plate 56 will then simultaneously contact track 20 when first cylinder 32 is extended so as to engage track 20 with second member 16.

As can best be seen in FIG. 4, linear segment 24 is comprised of a first curved plate 60 and a second curved plate 62 held together to form a rigid body by reinforcing member 23. First plate 60 and second plate 62 work together as a single structure to engage track 20 as described above referring to linear segment 24. When linear segment 24 is to engage the track, first plate 60 is moved into a position where first plate 60 rests along the inner side of alignment cogs 70. First plate 60 and second plate 62 will then simultaneously contact track 20 when third cylinder 44 is extended so as to engage track 20 with linear segment 24.

As can best be seen in FIG. 1, pivot segment 22 is comprised of a first curved plate 64 and a second curved plate 66 held together to form a rigid body by reinforcing member 23. First plate 64 and second plate 66 work together as a single structure to engage track 20 as described above referring to pivot segment 22. When pivot segment 22 is to engage the track, first plate 64 is moved into a position where first plate 64 rests along the inner side of alignment cogs 70. First plate 64 and second plate 66 will then simultaneously contact track 20 when second cylinder 38 is extended so as to engage track 20 with pivot segment 22.

The reinforcement of the plates that make contact with the track is preferably accomplished by use of reinforcement member 23, which acts as a continuous curved reinforcement rib. It is understood, however, that this can be accomplished by utilizing a plurality of small studs or spacers between the plates or other suitable means as is known in the art.

Figure 5:
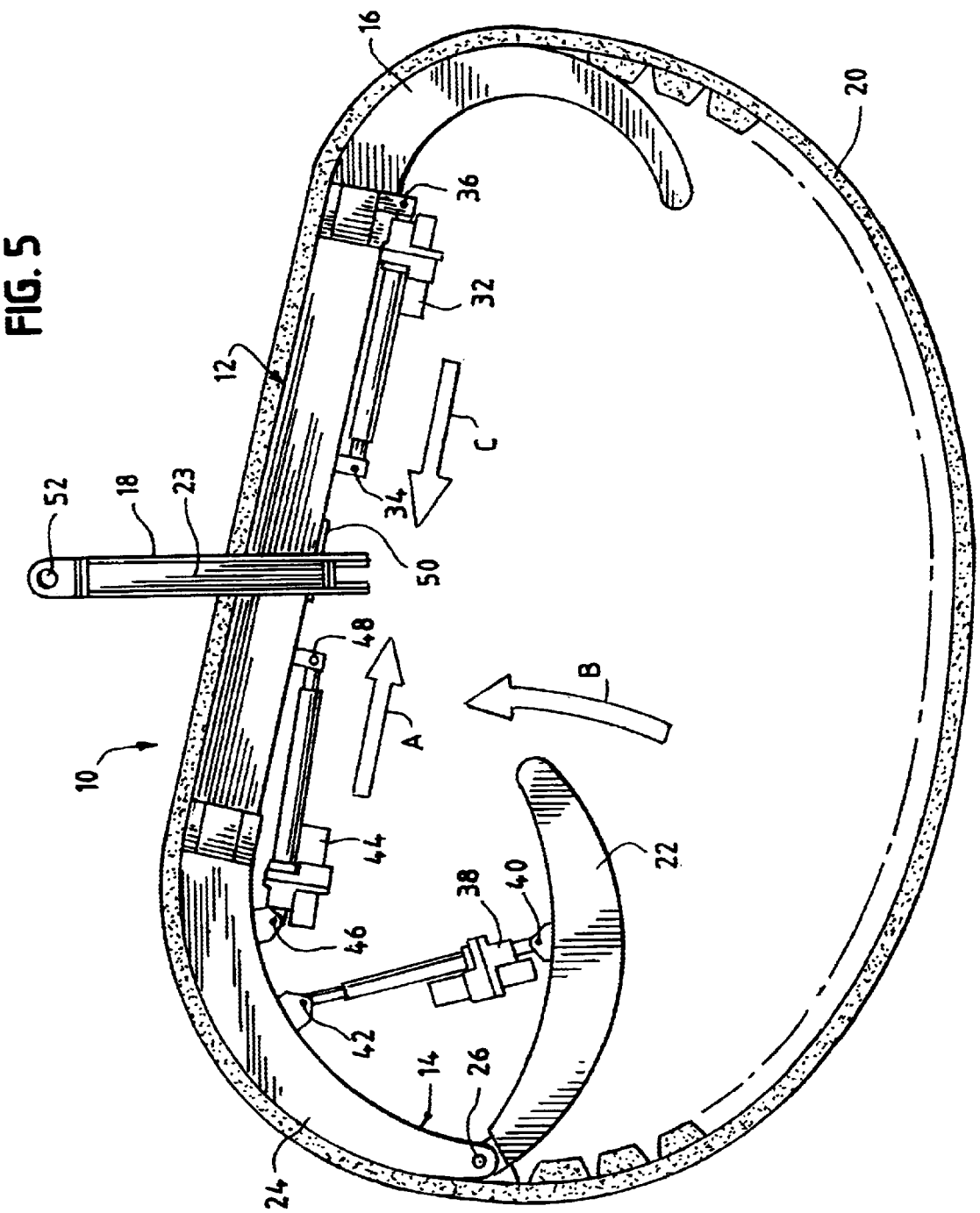
FIG. 5 is a side elevational view of the apparatus of FIG. 1 in a retracted position while the apparatus is engaging the track.

Turning to FIG. 5, apparatus 10 is shown in a retracted position while engaged with track 20, as linear segment 24 has been retracted in direction A, pivot segment 22 has been retracted in direction B, and second member 16 has been retracted in direction C. Apparatus 10 is engaged with track 20 along about one-half of the inner width of track 20 as can be seen in FIG. 3. The inner portion of track 20 is aligned by a set of central alignment cogs 70 running along the inner circumference of track 20. Alignment cogs 70 can best be seen in FIG. 1 and FIG. 3, where they are illustrated as running along the inside circumference of track 20 positioned equidistant to each side of the width of track 20. Apparatus 10 engages track 20 sufficiently close to alignment cogs 70 so as to manipulate and move track 20 while maintaining the center of gravity, thus preventing track 20 from falling off of apparatus 10. If desired, a clamping member (not shown) may be utilized to clamp track 20 to apparatus 10 after it is engaged.

The present invention is suitable for use with other tracks such as the track disclosed in U.S. Pat. No. 6,065,818 to Fischer. The track disclosed in the '818 patent cites a guide block on the inner surface of the track to maintain alignment. Apparatus 10 would necessarily function in a similar way for installation and removal of the track in the '818 patent. Further, the devices and methods in accordance with the present invention are useful regardless of whether a track guide block or other track alignment means or structure are present.

Extension and retraction are preferably accomplished by use of an electric actuator device. It is understood, however, that this can be accomplished by hydraulic or other suitable means as is known in the art.

Referring to FIG. 6, apparatus 10 is illustrated in a linearly extended position as linear segment 24 and second member 16 have been extended in directions D and E, respectively. Linear segment 24 and second member 16 have been extended away from elongated member 12. Linear segment 24 extends by the extension of third cylinder 44. Second member 16 extends by the extension of first cylinder 32. Through the extension of linear segment 24 and second member 16, track 20 is longitudinally configured to approximate the top portion of the installation shape while maintaining a desired orientation so as to not cause track 20 to fall off of apparatus 10.

Turning to FIG. 7, apparatus 10 is shown extended into the installation configuration as pivot segment 22 has been extended in direction F, thus conforming track 20 to the installation shape. Pivot segment 22 is extended by the extension of second cylinder 38. Track 20 has been placed for installation around a vehicle drive mechanism 72, which is not part of the invention and is shown for illustrative purposes only. Only one side of vehicle drive mechanism 72 is illustrated that includes drive wheel 74, front wheel 76 and rollers 78, each consisting of two halves separated by a channel in which alignment cogs 70 rest when track 20 is installed. Track 20 is placed around the inner half of drive wheel 74, front wheel 76 and rollers 78. Alignment cogs 70, located on the inner surface of track 20, fit into a channel or other structure of drive wheel 74, front wheel 76, and rollers 78. When the outer half of drive wheel 74, front wheel 76, and rollers 78 are respectively secured to their inner half, alignment cogs 70 maintain track 20 in proper alignment. Alignment cogs 70 remain inside the channel as alignment cogs 70 are advanced in the direction of movement, thus maintaining the proper alignment.

Referring now to FIG. 8, the disengagement of apparatus 10 by the linear and pivotal retraction in the directions A, B, and C of apparatus 10 from the placed track is shown. After insertion of alignment cogs 70 into the channel or otherwise placing track 20 in a mounting position, apparatus 10 is returned to a retracted position so that apparatus 10 can be disengaged from track 20. Track 20 is now partially installed on vehicle drive mechanism 72, and will rest on the inner half of drive wheel 74, front wheel 76, and rollers 78. Once apparatus 10 is removed from track 20 away from vehicle drive mechanism 72, the outer half of drive wheel 74, front wheel 76, and rollers 78 are respectively secured to their inner half. This method of installing or removing a track is quicker and safer than methods previously known in the art, and requires less manpower and effort and is a substantial advance in the art.

Turning to FIG. 9, a cross sectional view of elongated member 12 and first extension member 28 is shown. Inside elongated member 12, a set of contact ribs 29 facilitate the relative movement of first extension member 28 with respect to elongated member 12. In the illustrated embodiment there are eight contact ribs 29, two per side attached to first extension member 28. Second extension member 30 is likewise configured with eight contact ribs 29, as can be seen in FIG. 4. Contact ribs 29 act as a guide and spacer to facilitate movement inside of elongated member 12. Through the use of contact ribs 29, friction between the elongated member 12, first extension member 28 and second extension member 30 is minimized. The space provided by contact ribs 29 allows for the use of grease or other lubricating materials to further facilitate movement.

Figure 10:
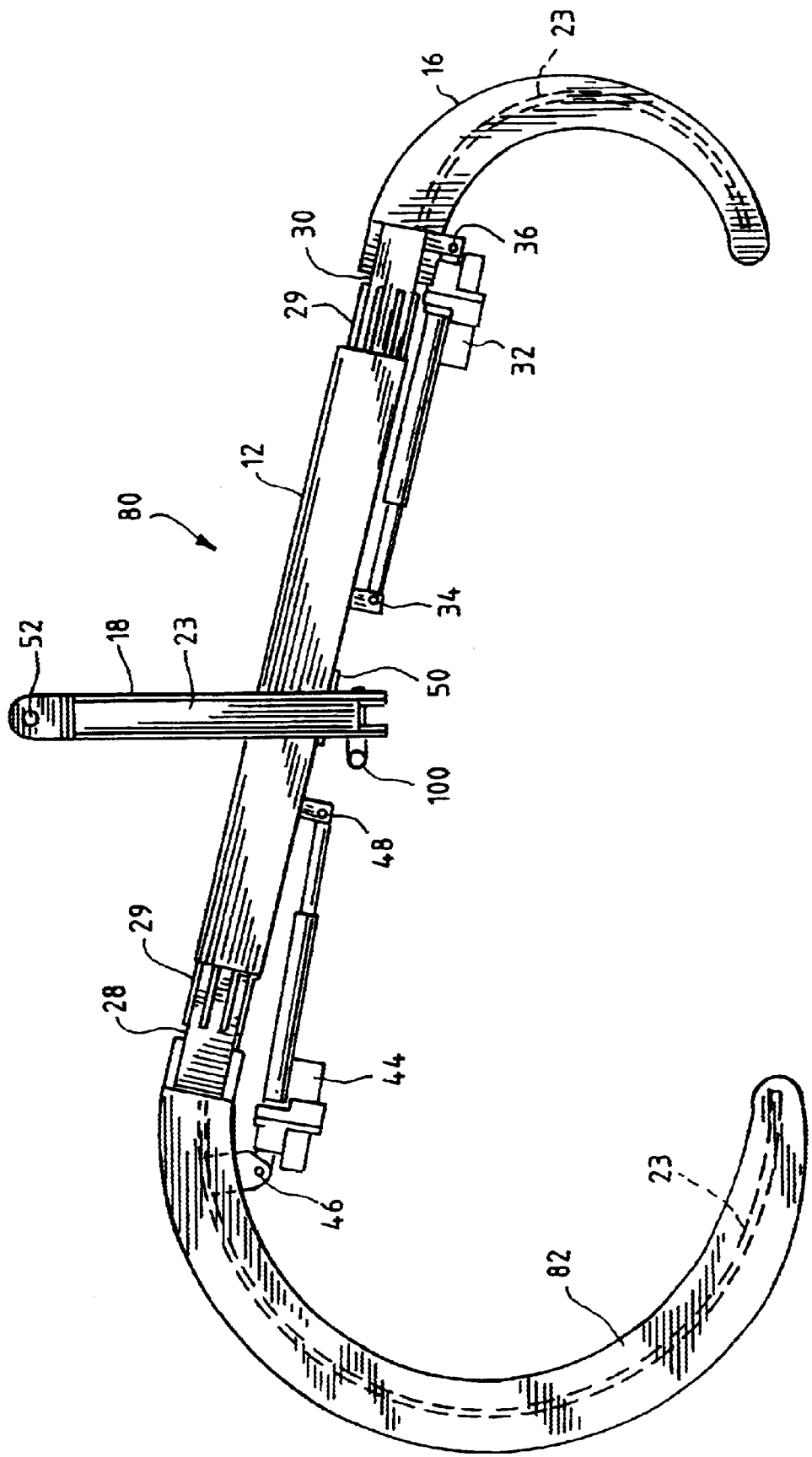
FIG. 10 is a side elevational view of an alternate embodiment of the invention.

Turning to FIG. 10, an apparatus 80 is shown, which is an alternate embodiment of the present invention. Although similar to apparatus 10, apparatus 80 is a contemplated variation of the present invention. Apparatus 80 is illustrated as having a fixed curvature that could be the approximate curvature of the invention curvature where the only extension to compensate the larger arc of track 20 is that of a linear extension. Both apparatus 10 and apparatus 80 perform similar functions although each has specific benefits. Apparatus 80 is made up of fewer parts and is thus contemplated to be more cost effective to produce, among other obvious benefits. While apparatus 10 is more versatile, it may also be more costly to manufacture. Obviously, either device can be built for a desired track size and installation curvature.

Apparatus 80 configures the larger arc of track 20 with first arcuate member 82 by the linear extension of first member 82. As illustrated, first member 82 is provided for the installation and removal of the larger arc of the multiple installation configurations. First member 82 has relatively flat and generally smooth contact points on the outer surface of first member 82 that engage track 20 for removal or installation. First member 82 is strengthened by reinforcing member 23. First member 82 extends and retracts linearly by the telescoping of third cylinder 44. Third cylinder 44 is attached to first member 82 by pin 46 and is likewise attached to elongated member 12 by pin 48. First member 82 moves linearly by way of first extension member 28 that is slidably received within elongated member 12. Elongated member 12 thus functions as a sleeve to the first extension member 28 through the engagement of contact ribs 29 with the inner surface of elongated member 12. Contact ribs 29 are fixed to the outer surface of first extension member 28 to facilitate the connection with elongated member 12. First member 82 is able to engage or disengage track 20 in a way that provides the desired shaping and curvature of the track through the linear extension and retraction of third cylinder 44 to a specified distance from elongated member 12. First member 82 is thus capable of contouring the larger curved portion of track 20 to the desired installation shape.

Second member 16 is illustrated as having relatively flat and generally smooth contact points on the outer surface of second member 16 that engage track 20 for removal or installation. Second member 16 is strengthened by reinforcing member 23. Second member 16 is linearly adjustable by way of second piston-like extension member 30. Second member 16 moves linearly by way of second extension member 30 that is slidably received within elongated member 12. Elongated member 12 thus functions as a sleeve to second extension member 30 through the engagement of contact ribs 29 with the inner surface of elongated member 12. Contact ribs 29 are fixed to the outer surface of second extension member 30 to facilitate the connection with elongated member 12. As illustrated, second member 16 is provided for the installation and removal of the smaller arc of the multiple installation configurations. Second member 16 is thus capable of contouring the smaller portion of track 20 to the desired installation shape through the adjustment of second member 16.

Second member 16, the contouring of the smaller arc of the multiple installation configurations is accomplished through the extension and retraction of second member 16 by the retraction of first retractable cylinder 32. First cylinder 32 is attached on one end to elongated member 12 by a pin 34 and is likewise attached to second member 16 by a pin 36 or by any other suitable structure. Second member 16 is able to engage or disengage track 20 in a way that provides the desired shaping and curvature of the track through the linear extension and retraction of first cylinder 32 to a specified distance from elongated member 12.

Now referring to first member 14, the forming or shaping of the larger arc of the multiple installation configurations can be accomplished by several different operations. These operations include the pivotal extension of pivot segment 22 and the linear extension of linear segment 24.

Figure 11:
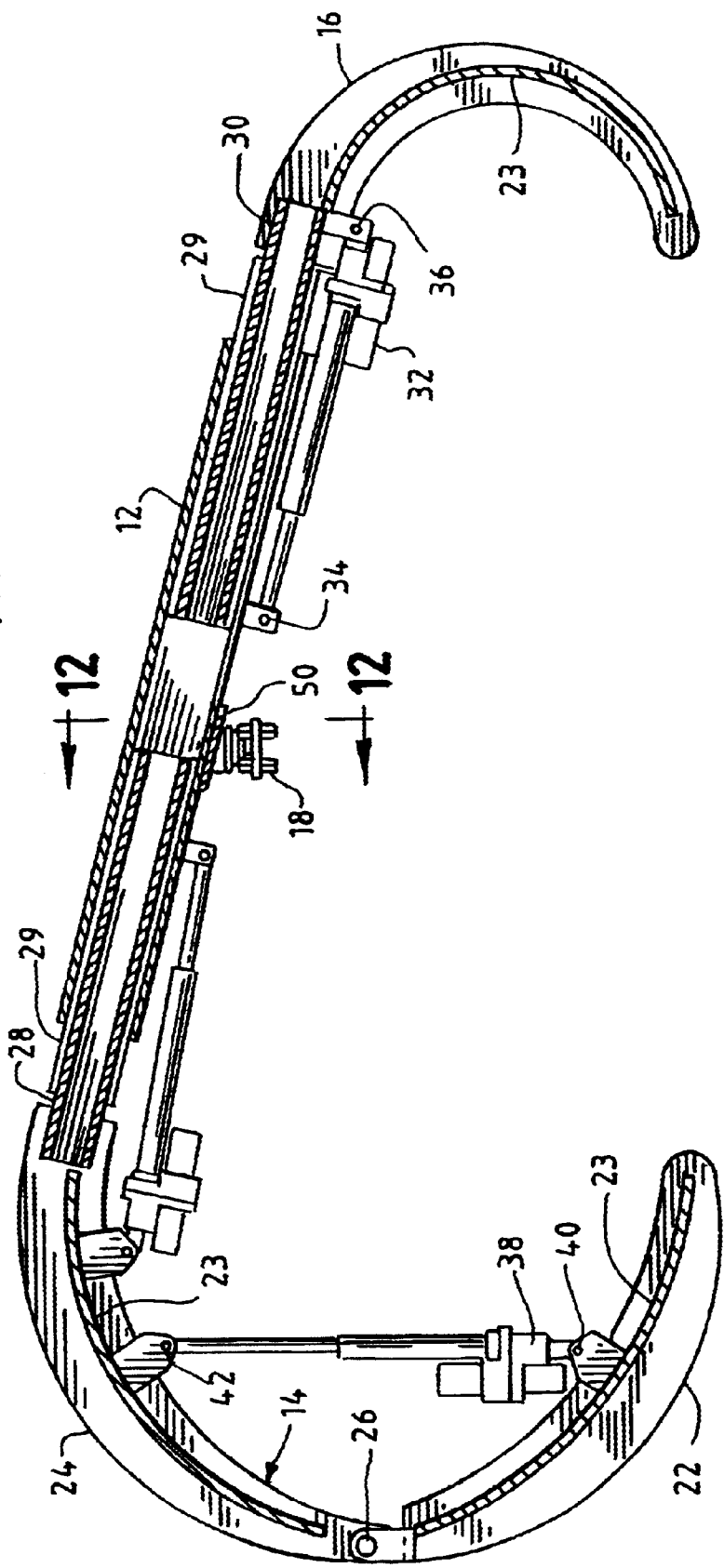
FIG. 11 is a cross sectional side elevational view of the apparatus taken along line 11—11 of FIG. 4.

Turning to FIG. 11, a cross section of apparatus 10 is shown. Reinforcing member 23 can be seen running along the inside of pivot segment 22, reinforcing segment 23, and second member 16. Reinforcing member 23 acts as a continuous reinforcement rib in the illustrated embodiment to strengthen and add rigidity to pivot segment 22, linear segment 24, and second member 16. Further illustrated in FIG. 11 is the relationship between first member 14 and elongated member 12 as well as the relationship between second member 16 and elongated member 12. As can be seen in FIG. 9 and FIG. 11, contact ribs 29 are in communication with elongated member 12.

Figure 12:
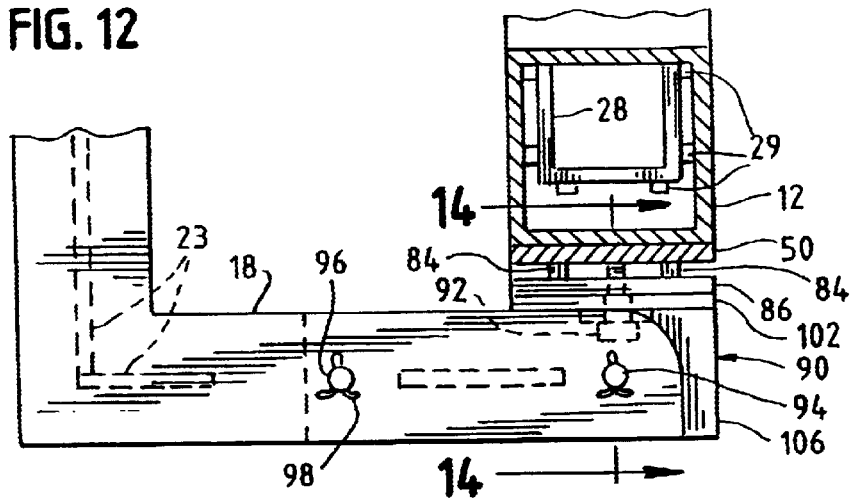
FIG. 12 is a side elevational view of the lift point structure of FIG. 11 with the elongated member illustrated from a front cross sectional view taken along line 12—12 of FIG. 11.
Figure 13:
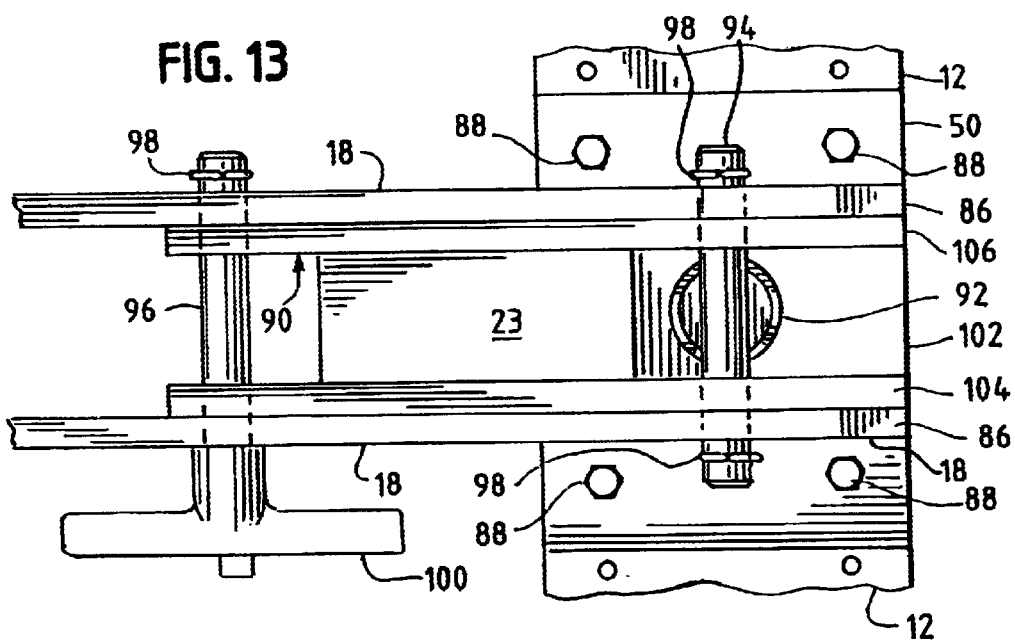
FIG. 13 is a bottom elevational view of a portion of the track installation apparatus of FIG. 1 illustrating the connection between the lift point structure and the elongated member.
Figure 14:
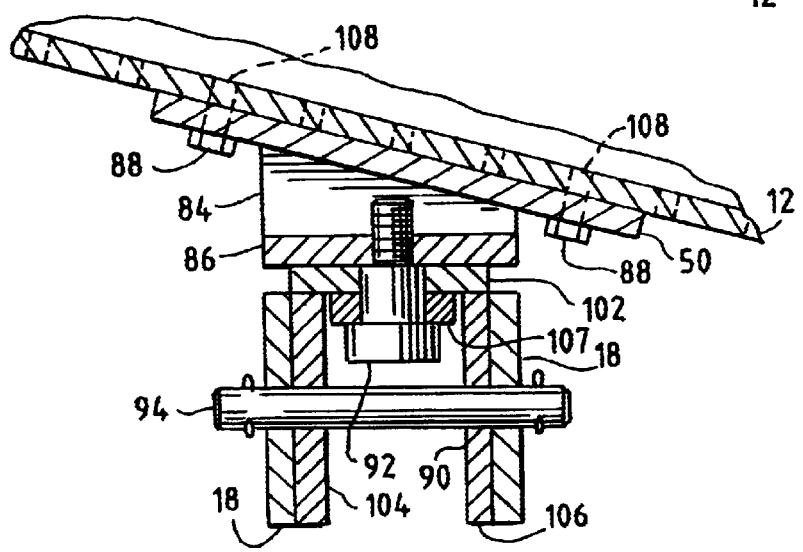
FIG. 14 is a cross sectional view of the lift point structure as it is attached to the elongated member taken along line 14—14 of FIG. 12.

FIGS. 12–14, illustrate details of lift structure 18 and the connection between lift structure 18 and mounting plate 50 as well as a cross section of elongated member 12 and first extension member 28. It is to be understood that any suitable lift structure can be utilized in accordance with the invention. Referring now to the cross section of elongated member 12, first extension member 28 can be seen with elongated member 12 in a downward sloping angle toward the front of apparatus 10. Contact ribs 29 are also depicted in communication with the inner surface of elongated member 12. Directly attached to the bottom of elongated member 12 is mounting plate 50, as shown in FIGS. 12–14.

Fixed to mounting plate 50 is a pair of slanted ribs 84 which are, in turn, fixed to a face plate 86. Slanted ribs 84 are slanted at a forward sloping angle to accommodate for the transition of angled apparatus 10 with vertically oriented lift structure 18. Apparatus 10 is generally sloped forward, from back to front, to approximate and accommodate for the slope required by vehicle drive mechanism 72 to allow for an efficient installation of track 20. Mounting plate 50, slanted ribs 84, and face plate 86 form one rigid body. Mounting plate 50 is directly connected to elongated member 12 by a set of bolts 88, which are shown in FIG. 13 and FIG. 14. The bottom side of mounting plate 50 is fixed to slanted ribs 84 which are fixed to face plate 86 that is connected to a lift structure mount 90. Lift structure mount 90 is connected to face plate 86 by a shoulder screw 92. Screw 92 attaches lift structure mount 90 to face plate 86 by screwing into face plate 86. Lift structure mount 90 then attaches to lift structure 18 by way of a first retaining pin 94 and a second retaining pin 96. First pin 94 and second pin 96 are illustrated having a cotter pin 98 to retain first pin 94 and second pin 96 in position. Together, first pin 94 and second pin 96 rigidly connect lift structure 18 with lift structure mount 90 to prevent unwanted shifting or slipping. Lift structure 18 and lift structure mount 90 are strengthened by reinforcing member 23.

Referring to FIG. 13, a bottom view is illustrated looking from underneath apparatus 10. Depicted in FIG. 13 is a clear view of lift structure mount 90, first pin 94, second pin 96, and mounting plate 50. Cotter pin 98 is shown securing each end of first pin 94 to prevent the sliding out or shifting of first pin 94 and otherwise to retain it. The second pin is shown with cotter pin 98 in only one end, the opposite end having a pin handle 100. Handle 100 is used to assist in the ease of removing second pin 96.

Lift structure mount 90 is composed of a lift structure mounting plate 102, a first linear plate 104 and a second linear plate 106. Lift structure mount 90 is also strengthened by reinforcement member 23 between first linear plate 104 and second linear plate 106, fixed between pin 94 and second pin 96. Lift structure mount 90 is configured in such a way so at to engage the inner portion of lift structure 18. First linear plate 104 and second linear plate 106 are located inside the plates of lift structure 18, and connect to lift structure 18 by first pin 94 and second pin 96. Once lift structure mount 90 is connected to lift structure 18, they act as one structure forming a continuous support arm to carry apparatus 10.

Referring to FIG. 14, a side elevational cross section of lift structure 18, lift mount structure 90, face plate 86, mounting plate 50, and elongated member 12 is shown. Lift structure 18 engages the outside of lift mount structure 90 by making flush contact with first linear plate 104 and second linear plate 106. First pin 94 is shown resting in the position where it would be located when connecting lift structure 18 and lift mount structure 90. Screw 92 is shown screwed into face plate 86 by passing through a washer 107 and lift structure mounting plate 102. One of slanted ribs 84 can be seen behind screw 92 as it is attached to mounting plate 50. Mounting plate 50 is attached to elongated member 12 by bolts 88, which are screwed into bolt holes 108.

As is understood by those skilled in the art, installation and removal of a track includes very similar steps, although in reverse order. For removal, generally apparatus 10 is placed into a position where it is able to engage track 20 once vehicle drive mechanism 72 is prepared for removal of track 20. Apparatus 10 then conforms to engage track 20 in such a way that it will be able to remove track 20 from vehicle drive mechanism 72. Engaged apparatus 10 then removes track 20 and places it in the desired location by retraction of apparatus 10. Further, for installation and removal of track 20 from either side of the vehicle, it is understood by those skilled in the art that adjustment may be needed to reverse the orientation of lift structure 18. This can be accomplished by the removal of screw 92 from face plate 86, followed by the reorientation of lift structure 18 to accommodate the installation or removal of track 20 from the other side of vehicle drive mechanism 72. Once lift structure 18 is refastened by insertion of screw 92 to elongated member 12, installation or removal can commence as previously described.

FIG. 15 illustrates a lift point structure 118, which is an alternative embodiment of lift structure 18. Lift structure 118 is shaped to permit apparatus 10 to engage a vehicle without removing fenders and other pieces of equipment. Lift structure 118 is versatile and maneuverable so that the vehicle does not need to be brought to apparatus 10 to remove or install track 20. Lift structure 118 is composed of a first lift segment 120, a second lift segment 122, and a third lift segment 124. Lift structure 118 connects to elongated member 12 by lift structure mount 90, which attaches to face plate 86 which is fixed to slanted ribs 84 and mounting plate 50. Mounting plate 50 attaches to elongated member 12 by bolts 88, which are threaded into bolt holes 108, as can also be seen in FIG. 14. Mounting plate 50 is adjustable along the X direction as indicated by the arrows, by the removal of bolts 88 and sliding mounting plate 50 along elongated member 12 to a position that will align mounting plate 50 with bolt holes 108. This allows lift structure 118 to hold apparatus 10 in such a way that when apparatus 10 engages track 20, the center of gravity from front to back of the apparatus 10 is maintained, as desired. As can be seen best in FIG. 14, mounting plate 50 is fixed to slanted ribs 84 which are fixed to face plate 86. Face plate 86 attaches to lift structure mounting plate 102 by screw 92, which screws into face plate 86 after passing though washer 107 and lift structure mounting plate 102. Lift structure mounting plate 102 is fixed to first linear plate 104 and second linear plate 106 connecting with lift structure 118 by first pin 94 and second pin 96.

First segment 120 connects to lift structure mount 90 by first pin 94 and second pin 96. The outside surface of lift structure mount 90 rests flush with the inside surface of first segment 120. First segment 120 makes a right angle or any other desired angle that continues from lift structure mount 90 to second segment 122. The inside surface of second segment 122 fits flush with the outside surface of first segment 120. A first set of pin holes 126 on first segment 120 are aligned with a second set of pin holes 128 on second segment 122. Two of each set of holes are then selected to connect first segment 120 with second segment 122 by the insertion of pins 130. Due to the adjustment capabilities in the Z directions as indicated by the arrows, lift structure 118 can now accommodate the installation and removal of tracks for various machinery and vehicle drive systems that may have a variety of obstructions that would have previously prevented installation or removal.

Second segment 122 makes a right angle that continues from the beginning of second set of pin holes 128 to the end of a third set of pin holes 132, and attaches to third segment 124. The outside surface of second segment 122 fits flush with the inside surface of third segment 124. Third set of pin holes 132 on second segment 122 are aligned with a fourth set of pin holes 134 on third segment 124. Two of each set of holes are then selected to connect second segment 122 with third segment 124 by the insertion of pins 136. Due to the adjustment capabilities in the Y directions as indicated by the arrows, lift structure 118 can now accommodate the installation and removal of tracks for various machinery and vehicle drive systems that may have a variety of obstructions that would have previously prevented installation or removal. Further, the adjustment capabilities in the Y direction allow for the installation and removal of various widths of tracks as may be used on differing machinery.

Third segment 124 is finally attached to the structure 53, through which apparatus 10 is carried. Third segment 124 is connected to structure 53. Structure 53 is fixed to third segment 124. A set of bolt holes 138 on structure 53 is aligned with the holes in opening 52 that are then attached by a set of bolts 140. Structure 53 is also adjustable in the Y direction as indicated by the arrows to allow lift structure 118 to compensate for the center of gravity from side to side of apparatus 10. This adjustment in the Y direction prevents unnecessary stresses and strains on lift structure 118 so as to prevent premature failure of lift structure 118.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. An apparatus for installing a continuous vehicle track onto a track driven vehicle or portion thereof, comprising:

a first curved track engaging member;

a second curved vehicle track engaging member; and an elongated member connecting said first and second curved vehicle track engaging members in opposed relation, said elongated member being of an adjustable length to permit the distance between said first and second curved vehicle track engaging members to be adjusted, the first and second vehicle track engaging members and the elongated member defining an outer surface along which said vehicle track may be supported.

2. The apparatus of claim 1 wherein said first curved track engaging member has a curvature that approximates the installed curvature of that portion of the track engaged by the first curved track engaging member.

3. The apparatus of claim 2 wherein said second curved track engaging member has an adjustable curvature, and when adjusted to a desired curvature, can approximate the installed curvature of that portion of the track engaged by the second curved track engaging member, said second curved track engaging member comprised of a pivot arm curved to approximate the installed curvature of that portion of the track engaged by the pivot arm.

4. The apparatus of claim 3 wherein said second curved track engaging member, when adjusted to a desired curvature, can approximate the installed curvature of that portion of the track engaged by the second curved track engaging member, said second curved track engaging member comprised of a pivot arm curved to approximate the installed curvature of that portion of the track engaged by the pivot arm.

5. The apparatus of claim 1 wherein a support having a longitudinally adjustable lift point structure that when longitudinally adjusted to a desired position approximates the location of an allowable lengthwise balance at or near the center of gravity in the lengthwise vertical plane of said elongated member when the apparatus is engaged with the track.

6. The apparatus of claim 5 wherein said support having a perpendicularly adjustable element relative to length of said elongated member that when adjusted to a desired position approximates the location of an allowable balance at or near the center of gravity in the perpendicular direction relative to the length of said elongated member to accommodate for tracks of varying sizes.

7. The apparatus of claim 5 wherein said support has a U-shaped gooseneck configuration.

8. The apparatus of claim 3 wherein said pivot arm having a pivotal connection to said second curved track engaging member and a selectively retractable and extendible cylinder to drive said pivot arm to cause said pivot arm to pivot and move inwardly or outwardly, respectively, in response to retraction or extension of said cylinder in the lengthwise vertical plane of said elongated member.

9. The apparatus of claim 3 wherein said elongated member has at least one selectively retractable and extendible cylinder connected to at least one curved engaging member at opposed ends extending or retracting at least one said curved track engaging member that when adjusted to a desired curvature can approximate the installed curvature of that portion of the track engaged by the respective extended or retracted curved track engaging member.

10. An apparatus for installing a continuous track onto a track driven vehicle or portion thereof, comprising:

first primary curved end track engaging means for engaging one end portion of the track engaged;

second primary curved end track engaging means, opposed to said first primary track engaging means, for engaging an end of the track opposite that engaged by said first primary track engaging means;

secondary track engaging means for engaging a portion of the track adjacent that portion of the track engaged by said second curved end means, said secondary track engaging means extending from and pivotally connected to said second primary curved end means; and means for connecting opposed said first curved end means with second curved end means for varying the distance between said primary and secondary track engaging means.

11. A method of installing a flexible drive track around the drive mechanism on a track-driven vehicle comprising:

providing an installation apparatus comprising a first curved track engaging member; a second curved track engaging member, said second curved track engaging member having an adjustable curvature; and an elongated member connecting said first and second curved track engaging members in opposed relation, said elongated member being of an adjustable length to permit the distance between said first and second curved track engaging members to be adjusted;

positioning the track around the installation apparatus having at least one member of the elongated member and the adjustable curved track engaging member in a retracted position;

conforming the track to the approximate shape of the track when installed on the vehicle and engaging the track with the installation apparatus by extending the elongated member;

placing the conformed flexible track around the vehicle drive mechanism; and removing the installation apparatus from within the track.

12. The method of claim 11 wherein the elongated member and the adjustable curved track engaging member are in a retracted position in performing the positioning step.

13. The method of claim 12 wherein the elongated member and the adjustable curved track engaging member are extended in performing the conforming step.

14. The method of claim 13 wherein the elongated member and the adjustable curved track engaging member are retracted in performing the disengaging step.

15. The method of claim 11 further comprising expanding the installation apparatus to tension the track prior to said disengaging step.

16. The method of claim 11 wherein said disengaging step is performed by retracting the extended member.

* * * * *